(12) United States Patent
Granado

(10) Patent No.: US 6,264,211 B1
(45) Date of Patent: Jul. 24, 2001

(54) RECIPROCATING SAW ATTACHMENT FOR ELECTRIC DRILL

(76) Inventor: Rene Granado, 284 Lorton Ave., Apt 209, Burlingame, CA (US) 94010

(*) Notice: Subject to any disclaimer, the term of this patent is extended or adjusted under 35 U.S.C. 154(b) by 0 days.

(21) Appl. No.: 09/413,260

(22) Filed: Oct. 6, 1999

(51) Int. Cl.[7] .................. F16H 21/18; B23B 45/00
(52) U.S. Cl. ........................ 279/143; 30/500; 74/49; 173/29; 279/144; 408/22
(58) Field of Search ................ 30/500; 279/144, 279/147, 143, 150, 902; 173/29; 408/20, 22, 24, 30, 239 A, 241 R; 74/49

(56) References Cited

U.S. PATENT DOCUMENTS

| | | | |
|---|---|---|---|
| Re. 36,558 | * | 2/2000 | Moore et al. ............ 279/147 |
| 257,309 | * | 5/1882 | Ford ....................... 408/24 |
| 2,621,685 | * | 12/1952 | Butz ....................... 30/500 |
| 2,822,005 | * | 2/1958 | Lee et al. ................. 30/500 |
| 3,759,336 | * | 9/1973 | Marcovitz et al. ......... 408/20 |
| 3,876,015 | * | 4/1975 | Kivela ..................... 173/29 |
| 4,101,238 | * | 7/1978 | Reibetanz et al. .......... 408/204 |
| 4,741,651 | * | 5/1988 | Despres ................... 408/209 |
| 4,760,643 | * | 8/1988 | Juma ...................... 144/218 |
| 4,841,643 | * | 6/1989 | Colella et al. ............. 30/500 |
| 4,949,463 | * | 8/1990 | Chen ...................... 30/500 |
| 4,972,589 | * | 11/1990 | Povleski .................. 30/500 |
| 5,083,376 | * | 1/1992 | Lentino ................... 30/392 |
| 5,096,341 | * | 3/1992 | Despres ................... 408/68 |
| 5,316,415 | * | 5/1994 | Chiu ...................... 408/24 |
| 5,566,768 | * | 10/1996 | Bourke .................... 173/29 |
| 5,595,250 | * | 1/1997 | Bourke .................... 173/29 |
| 5,607,265 | * | 3/1997 | Lane ...................... 408/20 |
| 5,755,293 | * | 5/1998 | Bourke .................... 173/29 |

* cited by examiner

Primary Examiner—Steven C. Bishop
(74) Attorney, Agent, or Firm—John Gugliotta

(57) ABSTRACT

A universal, quick connect, reciprocating saw attachment for electric drills is disclosed, designed as an adapter that converts a power rotary drill into a reciprocating saw. The present invention converts the rotary action of a drill into the necessary reciprocating action to power a saw blade. The present invention adapts to the housing of various cordless drills and provides for a connection of a steel shank to the drill chuck. A gear box with a reciprocating mechanism inside the housing then provides a coupling to a saw blade to provided the necessary cutting action of a conventional reciprocating saw. Additionally, there are buttons that are designed to expand in and out to tighten the chuck which holds the adapter. The housing is made of a heavy duty impact resistant plastic with the associated gears and reciprocating mechanism made from hardened steel. Coupled with a cordless drill, and a saw blade, the present invention provides for the functions of two, usually separate, power tools in the convenience of one.

11 Claims, 6 Drawing Sheets

RECIPROCATING SAW ATTACHMENT FOR ELECTRIC DRILL

RELATED APPLICATIONS AND DISCLOSURES

The present invention was first disclosed in the Disclosure Document filed on Nov. 18, 1999. There have been no previously filed, nor any co-pending applications, anywhere in the world.

BACKGROUND OF THE INVENTION

1. Field of the Invention

The present invention relates generally to power hand tools, and, more particularly, to a universal, quick connect, reciprocating saw attachment for cordless drills.

2. Description of the Related Art

General construction and wood working projects require a wide variety of power tools to accomplish the job properly. Two power tools that have proven themselves worthy of inclusion in any toolbox are the power drill and the reciprocating saw.

The ability for the drill to produce a hole in just about any material and the reciprocating saw's ability to quickly cut in small, close quarters make them very valuable indeed. However, many individuals do not have the money to afford both tools. The expense for both tools duplicates components that are almost identical in both tools. This redundancy is immediately evident when one looks at both tools and notices that the back half of each is identical in configuration. Also, many individuals do not have the space to store both of the tools. Finally and perhaps the most important, the time spent keeping track of each tool on the job site and having it handy when work needs to be done is an inconvenience. Inevitably, the situation arises where the proper tool is not on hand, and, as a result, time and money are wasted in tracking it down. Accordingly, there is a constant need for new and innovative products that will afford construction workers, wood workers and the like the benefits of the aforementioned devices in a single convenient tool.

In the related art, several devices are disclosed that describe a drill/saw apparatus for converting rotary drill to a reciprocating saw. These include U.S. Pat. No. 5,755,293, issued in the name of Bourke, U.S. Pat. No. 5,595,250, issued in the name of Bourke, U.S. Pat. No. 5,566,768, issued in the name of Bourke, U.S. Pat. No. 4,949,463, issued in the name of Chen and U.S. Pat. No. 4,841,643, issued in the name of Colella et al.

Several patents disclose a hole saw for use in a hand drill. These include U.S. Pat. No. 5,096,341, issued in the name of Despres, U.S. Pat. No. 4,760,643, issued in the name of Juma, U.S. Pat. No. 4,741,651, issued in the name of Despres and U.S. Pat. No. 4,101,238, issued in the name of Reibetanz et al.

U.S. Pat. No. 5,316,415, issued in the name of Chiu, describes a power drill adapter with a saw blade transmission.

U.S. Pat. No. 5,083,376, issued in the name of Lentino, discloses a bevel gear set to convert rotary drill to a reciprocating saw.

U.S. Pat. No. 4,972,589, issued in the name of Povleski, describes various cutting and sanding attachments for a rotary drill.

U.S. Pat. No. 257,309, issued in the name of Ford, discloses an apparatus with provisions for drilling or boring, circular sawing, or scroll sawing.

A search of the prior art did not disclose any patents that anticipate directly many features of the instant invention. Consequently, a need has been felt for providing an apparatus and method which overcomes the problems cited above.

SUMMARY OF THE INVENTION

It is therefore an object of the present invention to provide an improved universal, quick connect, reciprocating saw attachment for all electric drills that allows a power rotary drill to be used as a reciprocating saw.

Briefly described according to one embodiment of the present invention, a universal, quick connect, reciprocating saw attachment for cordless drills is disclosed, designed as an adapter that converts a power rotary drill into a reciprocating saw. The present invention converts the rotary action of a drill into the necessary reciprocating action to power a saw blade. The present invention adapts to the housing of various cordless drills and provides for a connection of a steel shank to the drill chuck. A gear box with a reciprocating mechanism inside the housing then provides a coupling to a saw blade to provide necessary cutting action of a conventional reciprocating saw. Additionally, there are buttons that are designed to expand in and out to tighten the chuck which holds the adapter. The housing is made of a heavy duty impact resistant plastic with the associated gears and reciprocating mechanism made from hardened steel. Coupled with a cordless drill, and a saw blade, the present invention provides for the functions of two, usually separate, power tools in the convenience of one.

It is another object of the present invention to provide a device that permits a drill to be used as a reciprocating saw, thereby saving time, money and space.

It is another object of the present invention to provide a device that is universal in design, being capable of attachment to all models of drills.

It is another object of the present invention to provide a device that is quick to connect and disconnect.

It is another object of the present invention to provide a device that is durable, long lasting, and requires little or no maintenance.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the FIGS. 1 through 9.

1. Detailed Description of the Figures

Figure 1:
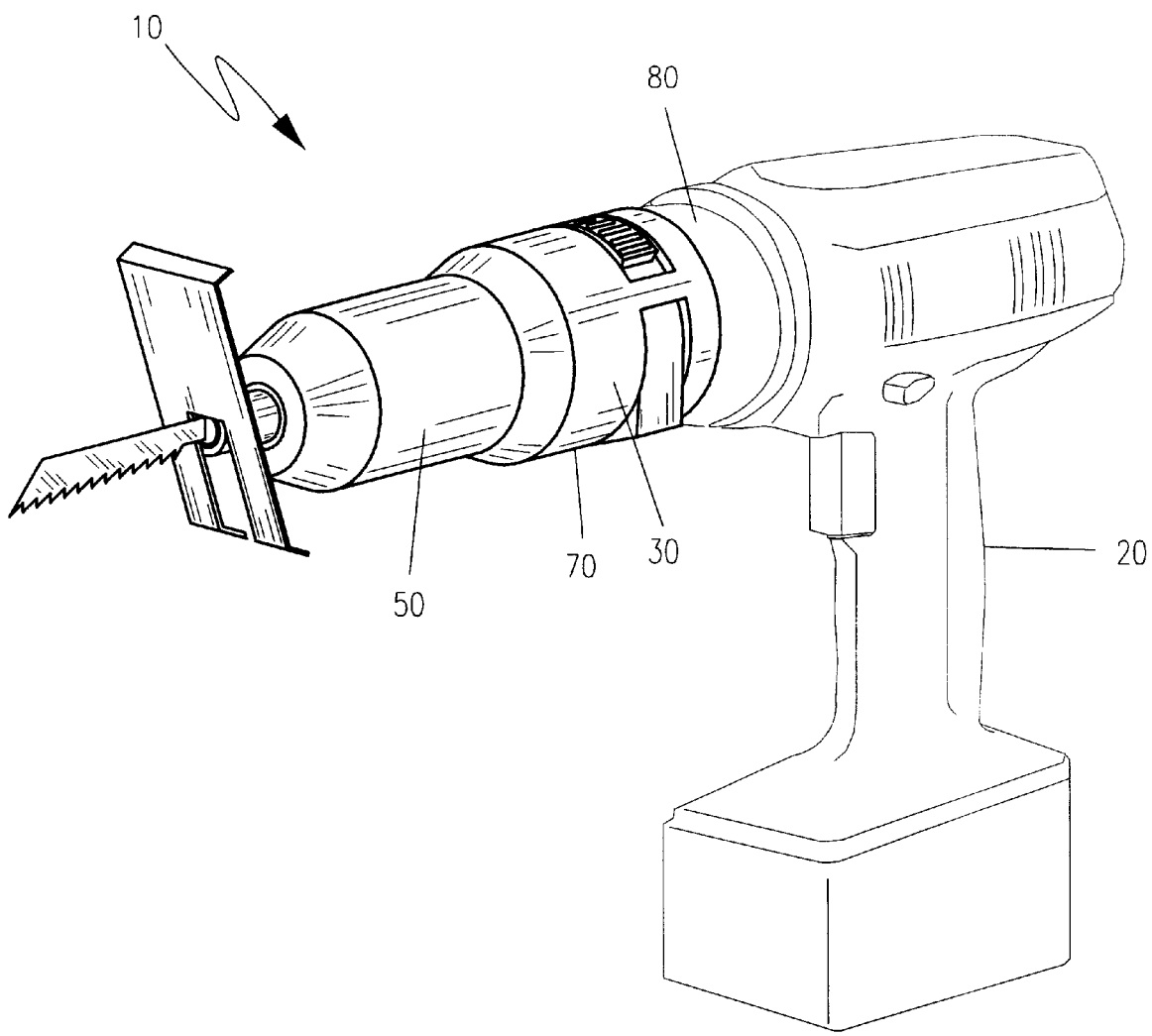
FIG. 1 is a perspective view of the preferred embodiment of universal, quick connect, reciprocating saw attachment for cordless drills 10.

Referring now to FIG. 1, a universal, quick connect, reciprocating saw attachment for cordless drills 10 is shown, according to the present invention, designed as an adapter that converts a power rotary drill 20 into a reciprocating saw. The present invention converts the rotary action of a drill 20 into the necessary reciprocating action to power a saw blade. The present invention adapts to various cordless drills 20.

Figure 2:
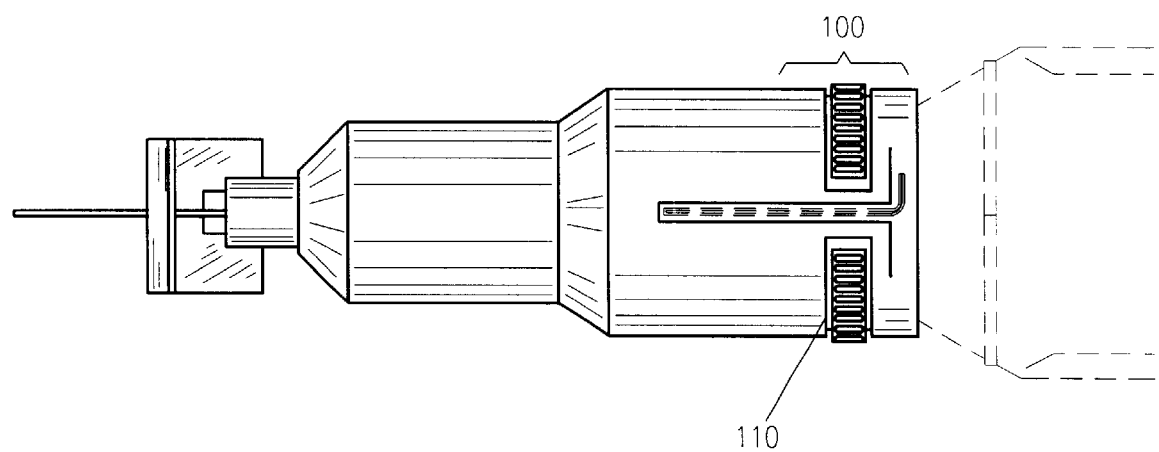
FIG. 2 is a top plan view of the present invention.
Figure 3:
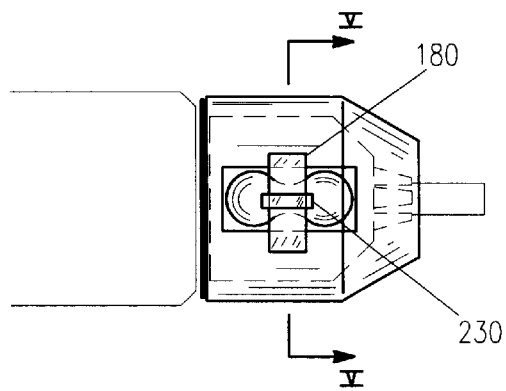
FIG. 3 is a side view thereof.

Referring now to FIGS. 1 through 3, according to the preferred embodiment of the present invention, the present invention comprises a main housing 30. The main housing 30 is designed to slide over and friction fit the anterior end of a drill 20, where the drill 20 chuck is located. The main housing 30 is constructed of a heavy duty impact resistant plastic.

The main housing 30 is of a generally linearly elongated, hollow, cylindrical configuration, with the anterior portion 50 of the main housing 30 designed to set around and over the revolving body 60 of the drill 20, allowing the revolving body 60 to perform its revolving function. The posterior portion 70 of the main housing 30 is designed to slide over and rest against the exterior surface area of the non-rotating anterior portion 80 of the drill 20, behind the revolving body 60 of the drill 20.

Figure 4:
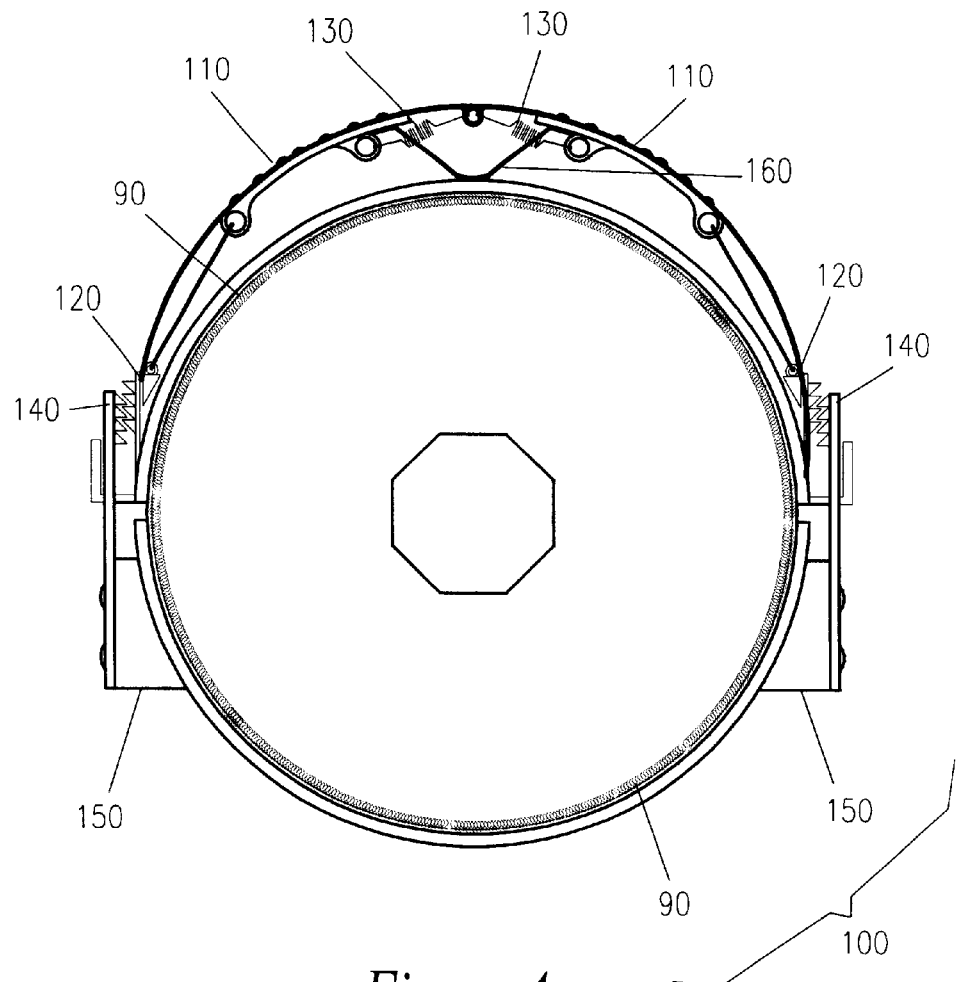
FIG. 4 is a side view of the drill securement means.

Referring now to FIG. 4, located on the interior surface of the posterior portion 70 of the main housing 30 is a thick, deformable material 90. The deformable material 90 is designed to conform to the specific exterior surface contours of the non-rotating anterior portion 80 of the drill 20. The interior diameter of the posterior portion 70 of the main housing 30 is of sufficient size to permit the main housing 30 to slide over and engage the drill 20's non-rotating anterior portion 80 once tightened down on the drill 20.

Referring now to FIGS. 2 and 4, the posterior portion 70 of the main housing 30 is releasably secured to the non-rotating anterior portion 80 of the drill 20 via drill securement means 100. For purposes of disclosure, the drill securement means 100 is depicted as a dual teeth band clamp 110 which is self tightening when the main housing 30 posterior portion 70 is squeezed together. Locking dowels 120, one located on each end of the band clamp upper portion 130, come into mechanical interference with and lock with teeth 140 located on the band clamp lower portion 150. The teeth 140 are radially exterior to the locking dowels 120.

A quick release means 160 allows the dual teeth band clamp 110 to be released in a fast manner. For purposes of disclosure, the quick release means 160 is depicted as a spring loaded, retractable upper portion.

Figure 5:
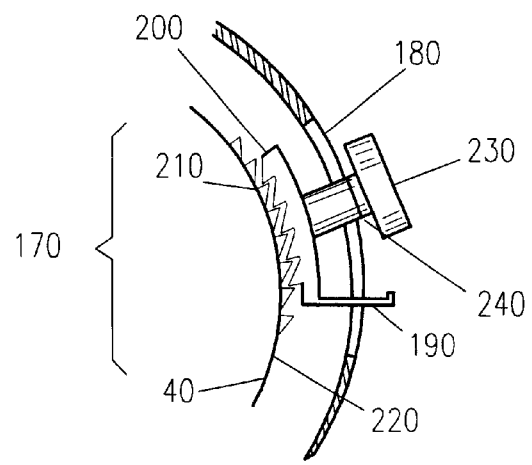
FIG. 5 is a cross sectional view, cut along line V—V of FIG. 3, showing a drill chuck tightening assembly.

Referring now to FIGS. 1, 3 and 5, located on the exterior circumferential surface of the anterior portion 50 of the main housing 30 are a pair of drill chuck tightening assemblies 170. The drill chuck tightening assemblies 170 are designed to function with automatically tightening, also known as keyless, chucks 40.

Each drill chuck tightening assembly 170 is composed of a groove 180, located on each side of the main housing 30. Each groove 180 runs along the exterior circumferential surface of the main housing 30 in a radial arc from the radial centerline of the main housing 30, such that when the present invention is secured to a drill 20, the drill 20 chuck 40 is accessible from the grooves 180.

A spring loaded button 190 is located in and slidably engages each groove 180. Each spring loaded button 190 is comprised of an interior protrusion 200, which has protrusion teeth 210 that releasably interlock with the exterior circumferential surface ribs of the drill chuck 40. The interior protrusion 200 is located inside of the main housing 30. The interior protrusion 200 is attached to an adjustment tab 230, located outside of the main housing 30, in the groove 180. The spring loaded button 190 is biased in the outward position, with the interior protrusion 200 pulled from the drill chuck 40, via a spring 240.

Radial pressure, placed by the user, on each adjustment tab 230 presses the interior protrusion 200 into the ribs on the drill chuck 40. By sliding the spring loaded buttons 190 in the grooves 180 in the same direction simultaneously, the automatic chuck 40 can be tightened. As such, the present invention is designed to allow for tightening of an automatically tightening chuck 40 when the main housing 30 is in place on the drill 20.

A chuck access hole 250 is located in the main housing 30, and large enough to permit access to the chuck 40 with a chuck key.

Figure 6:
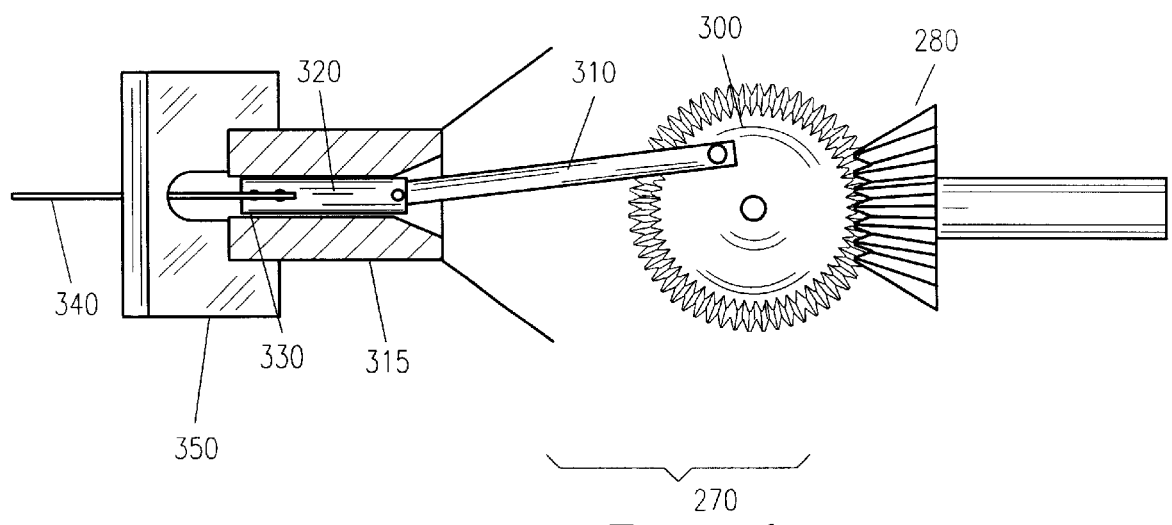
FIG. 6 is a top view of the revolving shaft and orbital gear assembly.
Figure 7:
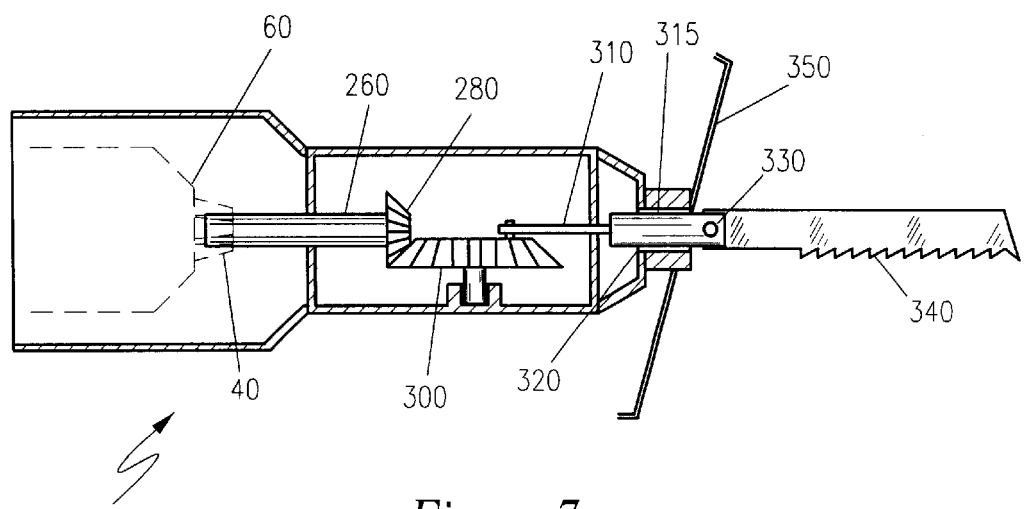
FIG. 7 is a side view of the revolving shaft and orbital gear assembly.
Figure 8:
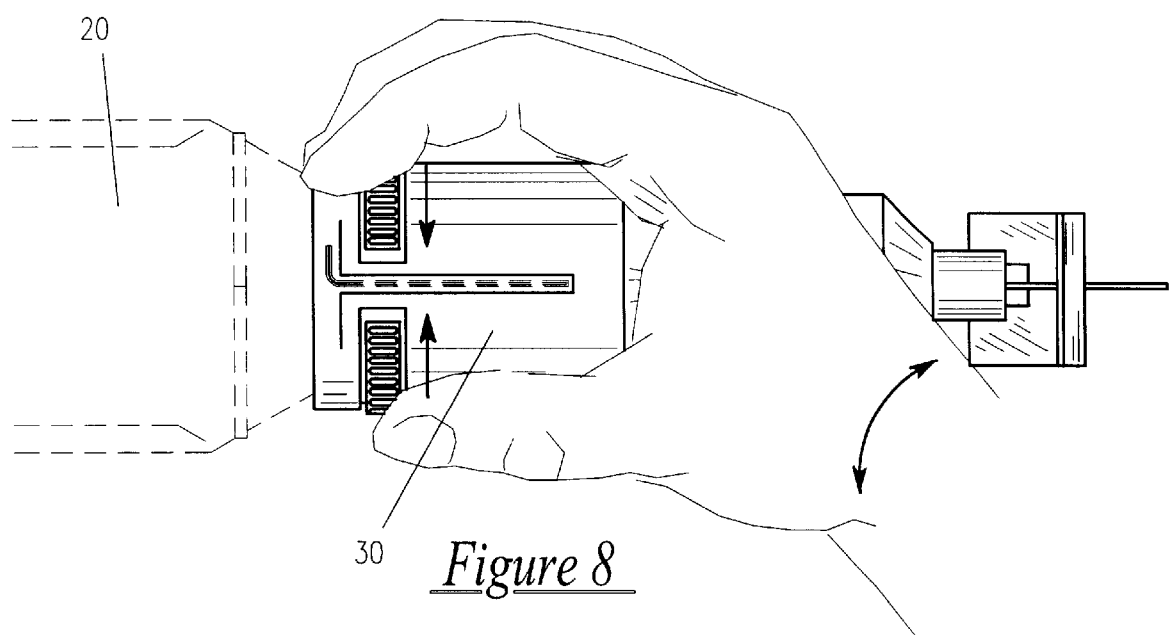
FIG. 8 is an in-use view of the present invention, showing how the drill chuck is tightened.
Figure 9:
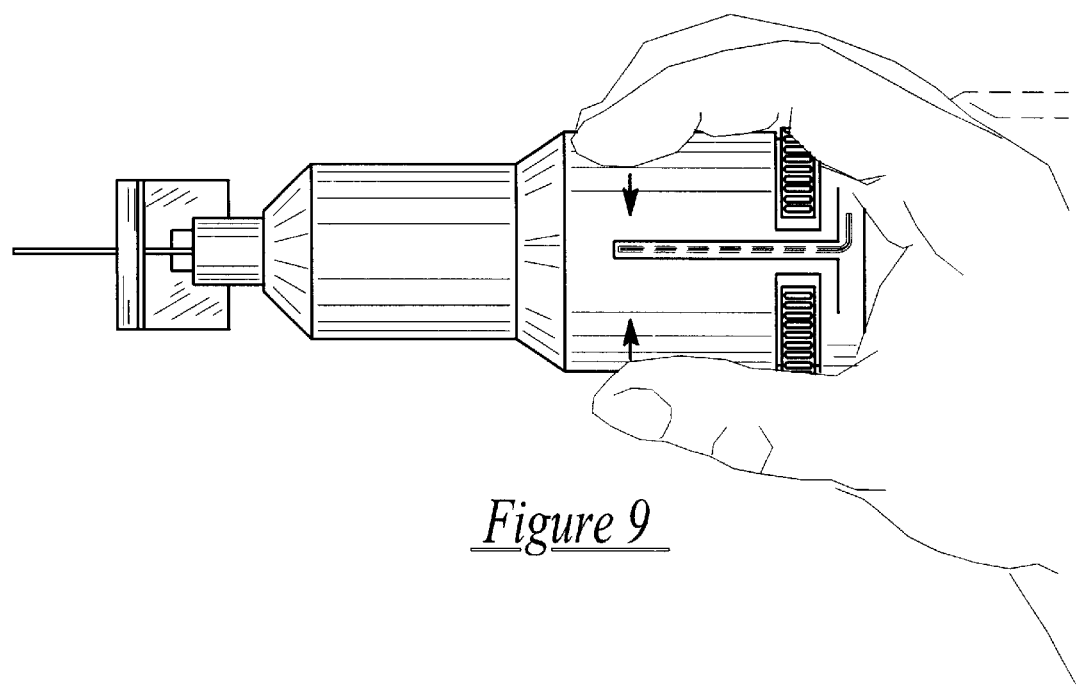
FIG. 9 is an in-use view thereof, showing the main housing being secured to the drill.

Referring now to FIGS. 6 and 7, located inside of the main housing 30 is a revolving shaft 260, of a generally linearly elongated configuration. The revolving shaft 260 is designed for slidable insertion into the chuck 40 of a traditional drill 20. The revolving shaft 260 has a plurality of sides that constitute the exterior surface, so as to reduce slippage once locked into the chuck 40 of the drill 20. For purposes of disclosure, the revolving shaft 260 is depicted as octagonal in configuration.

Located on one end of the revolving shaft 260 is an orbital gear assembly 270. The orbital gear assembly 270 consists of a first gear 280, affixed to the revolving shaft 260 and which rotates along the radial axis of the revolving shaft 260. A set screw allows for minor adjustment of the first gear in relation to the revolving shaft 260 and a second gear 300. The second gear 300 engages the first gear 280 perpendicular to the first gear 280.

A control arm 310, of a generally linearly elongated configuration, is pivotally secured to one flat side of the second gear 300, near the radial center of the second gear 300. The end of the control arm 310, opposite the second gear 300, is pivotally secured to a beam 320, which is located in and slidably engaging a control arm guide 315. The control arm guide 315 is designed to ensure that the beam 320 slides in a vector parallel to the radial centerline of the revolving shaft 260. As such, an in and out movement relative to the orbital gear assembly 270 is created with the beam 320.

The end of the control arm guide 315, closest to the orbital gear assembly 270, is flared outward, so as to allow for the range of motion of the control arm 310 as the second gear 300 rotates. As the second gear 300 rotates, the control arm 310 moves in a generally elliptical pattern, thereby transferring power to the beam 320. Both ends of the control arm 310 pivot in the same plane. This plane is parallel to the plane formed by the flat surface of the second gear 300 and perpendicular to the radial centerline of the second gear 300.

The end of the beam 320, opposite the control arm 310, has a saw blade retention means 330. The saw blade retention means 330 is designed to hold a traditional reciprocating saw blade 340.

A cutting guide 350 is attached to the saw blade retention means 330, on the outside of the main housing 30. The cutting guide 350 is designed to provide an adjustable, flat surface to rest on a cutting surface to facilitate cutting.

Coupled with a cordless drill 20, and a saw blade, the present invention provides for the functions of two, usually separate, power tools in the convenience of one.

It is envisioned that other styles and configurations of the present invention can be easily incorporated into the teachings of the present invention, and only one particular configuration shall be shown and described for purposes of clarity and disclosure and not by way of limitation of scope.

2. Operation of the Preferred Embodiment

To use the present invention, open the automatic chuck 40 on the drill 20. Make sure the drill securement means 100 is released. Slide the revolving shaft 260 into the drill 20 chuck 40, which also places the main housing 30 over the drill 20. To tighten the chuck 40, push down on the spring loaded buttons 190 in the grooves 180 and slide them in the same direction simultaneously. Squeeze down on the drill securement means 100.

To remove the present invention, squeeze the spring loaded buttons 190 and slide them in the same direction to loosen the chuck 40. Reverse the drill 20 motor, release the drill securement means 100, and remove the main housing 30 from the drill 20.

The foregoing description is included to illustrate the operation of the preferred embodiment and is not meant to limit the scope of the invention. The scope of the invention is to be limited only by the following claims.

What is claimed is:

1. A universal, quick connect, reciprocating saw attachment for cordless drills comprising:
    a main housing, said main housing being of a generally linearly elongated, hollow, cylindrical configuration, designed to slide over and friction fit the anterior end of a drill, where the drill chuck is located, said main housing having an anterior portion and a posterior portion, said posterior portion designed to slide over and rest against the exterior surface area of the non-rotating anterior portion of said drill, behind the revolving body of said drill;
    a deformable material, said deformable material located on the interior surface of said posterior portion of said main housing, said deformable material designed to conform to the specific exterior surface contours of said non-rotating anterior portion of said drill;
    drill securement means, said drill securement means designed to releasably secure said posterior portion of said main housing to said non-rotating anterior portion of said drill;
    at least one drill chuck tightening assemblies, said drill chuck tightening assemblies located on the exterior circumferential surface of said anterior portion of said main housing, and are designed to assist in the tightening and loosening of automatically tightening chucks; and
    internal components, said internal components located inside of said main housing and designed to transfer said drill's rotational force into a reciprocating saw movement.

2. The universal, quick connect, reciprocating saw attachment for cordless drills described in claim 1, wherein said drill securement means further comprises:
    a dual teeth band clamp, said dual teeth bank clamp designed to be self tightening when said main housing posterior portion is squeezed together;
    locking dowels, said locking dowels located on each end of the band clamp upper portion, said locking dowels designed to come into mechanical interference with and lock with teeth located on said band clamp lower portion; and
    a quick release means, said quick release means designed to allow the dual teeth band clamp to be released in a fast manner.

3. The universal, quick connect, reciprocating saw attachment for cordless drills of claim 2, wherein said quick release means is a spring loaded, retractable upper portion.

4. The universal, quick connect, reciprocating saw attachment for cordless drills described in claim 1, wherein each drill chuck tightening assembly further comprises:
    a groove, said groove located on each side of said main housing, said groove running along the exterior circumferential surface of said main housing in a radial arc from the radial centerline of said main housing, such that when the present invention is secured to said drill, said drill chuck is accessible from said grooves; and
    a spring loaded button, said spring loaded button located in and slidably engages each groove.

5. The universal, quick connect, reciprocating saw attachment for cordless drills of claim 4, wherein each said spring loaded button further comprises:
    an interior protrusion, said interior portion having teeth that releasably interlock with the exterior circumferential surface ribs of said drill chuck, said interior protrusion located inside of said main housing;
    an adjustment tab, said adjustment tab connected to said interior protrusion, said adjustment tab located outside of said main housing, in said groove; and
    a spring, said spring biasing said spring loaded button in the outward position, with said interior protrusion pulled from said drill chuck.

6. The universal, quick connect, reciprocating saw attachment for cordless drills of claim 5, wherein radial pressure, placed by the user, on each adjustment tab presses said interior protrusion into said ribs on said drill chuck.

7. The universal, quick connect, reciprocating saw attachment for cordless drills of claim 4, wherein by sliding said spring loaded buttons in said grooves in the same direction simultaneously, said a automatic chuck can be tightened.

8. The universal, quick connect, reciprocating saw attachment for cordless drills described in claim 1, wherein said internal components further comprise:
    a revolving shaft, said revolving shaft located inside of the main housing, and of a generally linearly elongated configuration, said revolving shaft designed for slidable insertion into said chuck of a traditional drill,
    a first gear, said first gear affixed to the revolving shaft and designed to rotate along the radial axis of the revolving shaft;

a second gear, said second gear engaging said first gear perpendicular to said first gear;

a control arm, said control arm of a generally linearly elongated configuration, pivotally secured to one flat side of said second gear, near the radial center of said second gear;

a beam, said beam secured to the end of said control arm, opposite said second gear, said beam designed to allow said control arm to pivot;

a control arm guide, said control arm guide designed to allow said beam to slidably engage said control arm guide;

a saw blade retention means, said saw blade retention means located at the end of said beam, opposite said control arm, said saw blade retention means designed to hold a traditional reciprocating saw blade; and a cutting guide, said cutting guide attached to said saw blade retention means, on the outside of said main housing, said cutting guide designed to provide an adjustable, flat surface to rest on a cutting surface to facilitate cutting.

9. The universal, quick connect, reciprocating saw attachment for cordless drills described in claim 1, wherein said main housing is constructed of a heavy duty impact resistant plastic.

10. The universal, quick connect, reciprocating saw attachment for cordless drills of claim 8, wherein said revolving shaft has a plurality of sides that constitute the exterior surface.

11. The universal, quick connect, reciprocating saw attachment for cordless drills of claim 10, wherein said revolving shaft is octagonal in configuration, having eight sides.

* * * * *